(12) United States Patent
Jin et al.

(10) Patent No.: US 9,167,283 B2
(45) Date of Patent: Oct. 20, 2015

(54) METHOD AND SYSTEM FOR PREVENTING DATA LOSS IN SWITCHING DATA TRANSMISSION MODE

(71) Applicant: Samsung Electronics Co., Ltd., Suwon-si, Gyeonggi-do (KR)

(72) Inventors: Jongwon Jin Jin, Suwon-si (KR); Jongkyu Kim, Anyang-si (KR); Heungki Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/170,942

(22) Filed: Feb. 3, 2014

(65) Prior Publication Data

US 2014/0223501 A1 Aug. 7, 2014

(30) Foreign Application Priority Data

Feb. 4, 2013 (KR) .................. 10-2013-0012619

(51) Int. Cl.
| | |
|---|---|
| *H04N 7/173* | (2011.01) |
| *H04N 21/238* | (2011.01) |
| *H04N 21/41* | (2011.01) |
| *H04N 21/44* | (2011.01) |
| *H04N 21/6587* | (2011.01) |
| *H04N 21/24* | (2011.01) |
| *H04N 21/414* | (2011.01) |
| *H04N 21/436* | (2011.01) |
| *H04N 21/4363* | (2011.01) |
| *H04N 21/643* | (2011.01) |
| *G06F 15/16* | (2006.01) |

(52) U.S. Cl.
CPC ..... *H04N 21/23805* (2013.01); *H04N 21/2401* (2013.01); *H04N 21/2408* (2013.01); *H04N 21/4122* (2013.01); *H04N 21/41407* (2013.01); *H04N 21/43615* (2013.01); *H04N 21/43637* (2013.01); *H04N 21/44004* (2013.01); *H04N 21/64322* (2013.01); *H04N 21/6587* (2013.01)

(58) Field of Classification Search
CPC .................. H04N 21/23805; H04N 21/64322; H04N 21/43615; H04N 21/41407; H04N 21/2401; H04N 21/2408; H04N 21/43637; H04N 21/44004; H04N 21/6587; H04N 21/4122
USPC .................. 725/94, 93, 95; 709/231, 232
See application file for complete search history.

(56) References Cited

U.S. PATENT DOCUMENTS

| | | | | |
|---|---|---|---|---|
| 8,548,048 | B2 * | 10/2013 | El-Maleh et al. | ........ 375/240.05 |
| 2002/0194609 | A1 * | 12/2002 | Tran | ................................ 725/95 |
| 2013/0003579 | A1 * | 1/2013 | Lu et al. | ........................ 370/252 |
| 2014/0120829 | A1 * | 5/2014 | Bhamidipati et al. | ....... 455/3.06 |

* cited by examiner

*Primary Examiner* — Hoang-Vu A Nguyen-Ba
(74) *Attorney, Agent, or Firm* — Jefferson IP Law, LLP (57) ABSTRACT

A wireless communication channel operation method and a system of the portable terminal for preventing data loss when switching between different wireless video transmission modes are provided. The method includes transmitting multimedia data to a recipient terminal on a communication channel of a second transmission mode in a wireless video transmission mode, the wireless video transmission mode supporting a first and second transmission modes, receiving buffer state information from the recipient terminal, pausing, when a request for switching to the first transmission mode is detected, transmission of the multimedia data to the recipient terminal, determining the buffer state information, waiting, when the buffer state information indicates presence of multimedia data in a reception buffer of the reception terminal, for completion of playing of the multimedia data in the reception buffer, and switching to the first transmission mode after the multimedia data in the reception buffer is played completely.

17 Claims, 6 Drawing Sheets

METHOD AND SYSTEM FOR PREVENTING DATA LOSS IN SWITCHING DATA TRANSMISSION MODE

CROSS-REFERENCE TO RELATED APPLICATION(S)

This application claims the benefit under 35 U.S.C. §119(a) of a Korean patent application filed on Feb. 4, 2013 in the Korean Intellectual Property Office and assigned Serial number 10-2013-0012619, the entire disclosure of which is hereby incorporated by reference.

TECHNICAL FIELD

The present disclosure relates to a portable terminal. More particularly, the present disclosure relates to a wireless communication channel operation method and system of the portable terminal for preventing data from being lost especially when switching between different wireless video transmission modes.

BACKGROUND

Recent mobile terminals are featured with various functions attractive to users. For example, the mobile terminals are provided with a voice telephony function, a still and/or motion picture capturing function, a broadcast playback function, an Internet access function, and/or the like.

More recently, the mobile terminals are featured with wireless video transmission function for transmitting video data (including audio data) to another terminal (e.g., a smart TV) through a wireless communication channel (e.g., Wi-Fi, Bluetooth, and cellular communication channels). According to the related art, Wi-Fi Display (WFD), Wireless Display (WiDi), and Miracast™ are representative wireless video transmission technologies.

If the wireless video transmission function is activated, the portable terminal transmits the video data to a recipient terminal through a Transmission Control Protocol (TCP) or a User Datagram Protocol (UDP) channel. Typically, the portable terminal uses the UDP channel for video data transmission to secure high data rate rather than reliability or the TCP channel to guarantee reliability. For example, the portable terminal may transmit the home screen data through the UDP channel and the motion picture data through the TCP channel.

In order to avoid fluctuation over a wireless communication channel and to guarantee seamless video quality, the transmission end should buffer the multimedia data, with a predetermined buffer size (or time). Likewise, the recipient terminal has a buffer with a predetermined buffer size to buffer the received multimedia data for seamless playback. Such buffering causes latency between the transmission terminal and the recipient terminal. Such time latency is prolonged when the radio communication environment between the transmission and recipient terminals deteriorates.

Meanwhile, the recipient terminal initializes the buffer when the transmission mode is changed. It is a shortcoming of the technology according to the related art that the multimedia data buffered in the reception buffer is discarded when the transmission mode is changed. This means that the multimedia data transmitted by the transmission terminal are lost as a result of the initialization of the reception buffer. For example, if the video playback of the recipient terminal stops in the state that the transmission terminal is transmitting the multimedia data to the recipient terminal, the transmission terminal changes the transmission mode from the TCP mode to UDP mode. At this time, the recipient terminal initializes the buffer to discard the buffered video data. As discussed above, one of the drawbacks of the video data transmission method and the video streaming method according to the related art is that the video data transmitted by the transmission terminal are not played entirely to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless communication channel operation method and system of a portable terminal that is capable of preventing the data from being lost in switching between data transmission modes.

In accordance with an aspect of the disclosure, a wireless communication channel operation method of a portable terminal is provided. The wireless communication channel operation method includes transmitting multimedia data to a recipient terminal on a communication channel of a second transmission mode in a wireless video transmission mode, the wireless video transmission mode supporting a first transmission mode and the second transmission mode, receiving buffer state information from the recipient terminal, pausing, when a transmission mode switching request for switching to the first transmission mode is detected, transmission of the multimedia data to the recipient terminal, determining the buffer state information, waiting, when the buffer state information indicates presence of multimedia data in a reception buffer of the reception terminal, for completion of playing the multimedia data in the reception buffer, and switching from the second transmission mode to the first transmission mode after the multimedia data in the reception buffer is played completely.

In accordance with another aspect of the disclosure, a wireless communication channel operation method of a portable terminal is provided. The wireless communication channel operation method includes playing multimedia data received from a transmission terminal on a communication channel of a second transmission mode in a wireless video transmission mode, the wireless video transmission mode supporting a first transmission mode and the second transmission mode, determining a state of a reception buffer periodically while playing the multimedia data, transmitting buffer state information generated based on the state of the reception buffer to the transmission terminal, and reestablishing, when a transmission mode switching request is received from the transmission terminal, the communication channel in the first transmission mode.

In accordance with another aspect of the disclosure, a wireless communication channel operation system is provided. The wireless communication channel operation system includes a transmission terminal and a reception terminal is characterized in that the transmission terminal transmits multimedia data to a recipient terminal on a communication channel of a second transmission mode in a wireless video transmission mode, the wireless video transmission mode supporting a first transmission mode and the second transmission mode, receives buffer state information from the recipient terminal, pauses, when a transmission mode switching request for switching to the first transmission mode is detected, transmission of the multimedia data to the recipient terminal, determines the buffer state information, waits, when the buffer state information indicates presence of multimedia data in a reception buffer of the reception terminal, for completion of playing of the multimedia data in the reception buffer is played completely, and switches from the second transmission mode to the first transmission mode after the multimedia data in the reception buffer, and the recipient terminal plays multimedia data received from a transmission terminal on a communication channel of a second transmission mode in a wireless video transmission mode, the wireless video transmission mode supporting a first transmission mode and the second transmission mode, determines a state of a reception buffer periodically while playing the multimedia data, transmits buffer state information generated based on the state of the reception buffer to the transmission terminal, and reestablishes, when a transmission mode switching request is received from the transmission terminal, the communication channel in the first transmission mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification and drawings are to be regarded in an illustrative rather than a restrictive sense in order to help understand the present disclosure. It is obvious to those skilled in the art that various modifications and changes can be made thereto without departing from the broader spirit and scope of the present disclosure.

Various embodiments of the present disclosure are directed to a system for communicating multimedia data (video and audio) between terminals through wireless communication channel. In the following, the description is made of the transmission terminal and the reception terminal separately.

According to various embodiments of the present disclosure, a terminal may include communication functionality. For example, a terminal may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, a terminal may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, a terminal may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, a terminal may be any combination of the foregoing devices. In addition, it will be apparent to one having ordinary skill in the art that a terminal according to various embodiments of the present disclosure is not limited to the foregoing devices.

As an example, according to various embodiments of the present disclosure, the transmission terminal is any of various portable terminals including cellular communication terminal, smartphone, tablet PC, PMP, PDA, and/or the like.

As an example, according to various embodiments of the present disclosure, the recipient terminal may be any of various electronic devices including desktop PC, laptop PC, smart TV, and/or the like.

Figure 1:
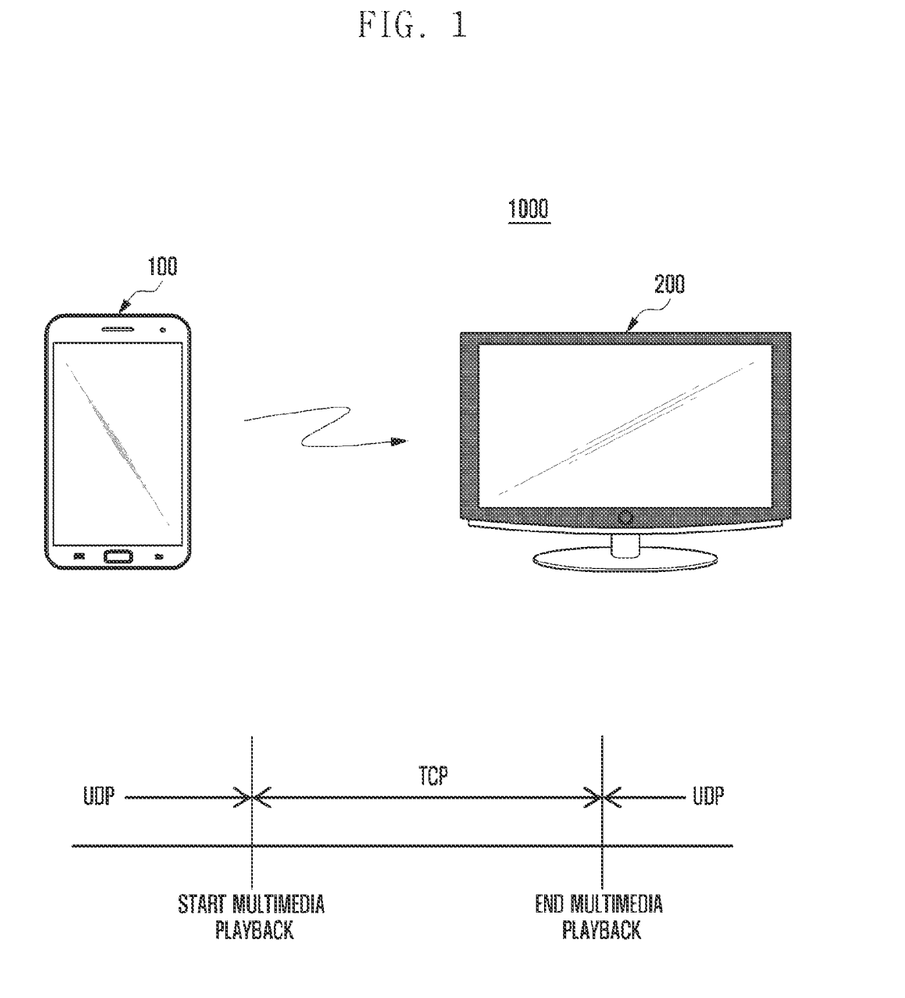
FIG. 1 is a schematic diagram illustrating a wireless communication operation system according to an embodiment of the disclosure.

FIG. 1 is a schematic diagram illustrating a wireless communication operation system according to an embodiment of the disclosure.

Referring to FIG. 1, according to various embodiments of the present disclosure, the system 1000 includes a transmission terminal 100 and a recipient terminal 200. For example, the transmission terminal 100 may be a portable terminal having relatively small screen, and the recipient terminal 200 may be an electronic appliance having a relatively large screen.

The transmission terminal 100 is connected to the recipient terminal 200 through a wireless communication channel to transmit video data to the recipient terminal 200. At this time, the wireless communication channel may be established based on one of the first transmission mode and the second transmission mode. According to various embodiments of the present disclosure, the first transmission mode is configured for fast data transmission (e.g., the first transmission mode guarantees fast data transmission), and the second transmission mode is configured for data transmission reliability (e.g., the second transmission mode guarantees data transmission reliability). For example, according to various embodiments of the present disclosure, the first transmission mode may be the UDP mode, and the second transmission mode may be the TCP mode.

According to various embodiments of the present disclosure, the transmission terminal 100 establishes a first transmission mode (e.g., UDP) channel with the recipient terminal 200 initially in the wireless video transmission mode and, if a multimedia playback request is input, the transmission terminal 100 establishes a second transmission mode (e.g., TCP) channel with the recipient terminal 200. Thereafter, if the multimedia data playback is terminated, the transmission terminal 100 switches from the second transmission mode channel to the first transmission mode channel. For example, if the wireless video transmission mode is activated, the transmission terminal 100 may transmit a home screen to the recipient terminal 200 through the first transmission mode channel. In this state, if the multimedia data playback is requested, the transmission terminal 100 switches the transmission mode to the second transmission mode and transmits the multimedia data to the recipient terminal 200 through the second transmission mode channel. If the multimedia data playback has completed, the transmission terminal 100 switches the transmission mode to the first transmission mode to transmit the home screen to the recipient terminal 200.

The recipient terminal 200 may receive and play the multimedia data transmitted by the transmission terminal 100. In order to play the multimedia data seamlessly, the recipient terminal 200 checks (e.g., determines) the state of a reception buffer (not shown) and sends the buffer state information to the transmission terminal 100.

If the buffer state information is received, the transmission terminal 100 determines whether a transmission mode switching request is input and, if the transmission mode switching request is detected, the transmission terminal 100 pauses the multimedia transmission. At this time, although the multimedia data playback has completed, the transmission terminal 100 may pause the multimedia data playback rather than terminate the multimedia data playback. The transmission terminal 100 may check (e.g., determine) the presence/absence of the multimedia data in the reception buffer of the recipient terminal 200 based on the received buffer state information. If the transmission terminal 100 determines that there is the multimedia data to be played in the reception buffer of the recipient terminal 200, the transmission terminal 100 waits for the completion of the playback of the multimedia data in the reception buffer of the recipient terminal 200. If the residual multimedia data in the reception buffer has been played completely, the transmission terminal 100 may switch the data transmission mode to the first transmission mode. In this way, according to various embodiments of the present disclosure, when a transmission mode switching request is input, the transmission terminal 100 waits until the multimedia data buffered in the reception buffer of the recipient terminal 200 are consumed completely and then the transmission terminal 100 performs the transmission mode switching. According to various embodiments of the present disclosure, the method is capable of solving the data loss problem at the recipient terminal 200. According to various embodiments of the present disclosure, the wireless communication channel operation method is advantageous, particularly, when the propagation latency is prolonged as a result of a bad channel environment between the transmission terminal 100 and the recipient terminal 200.

Figure 2:
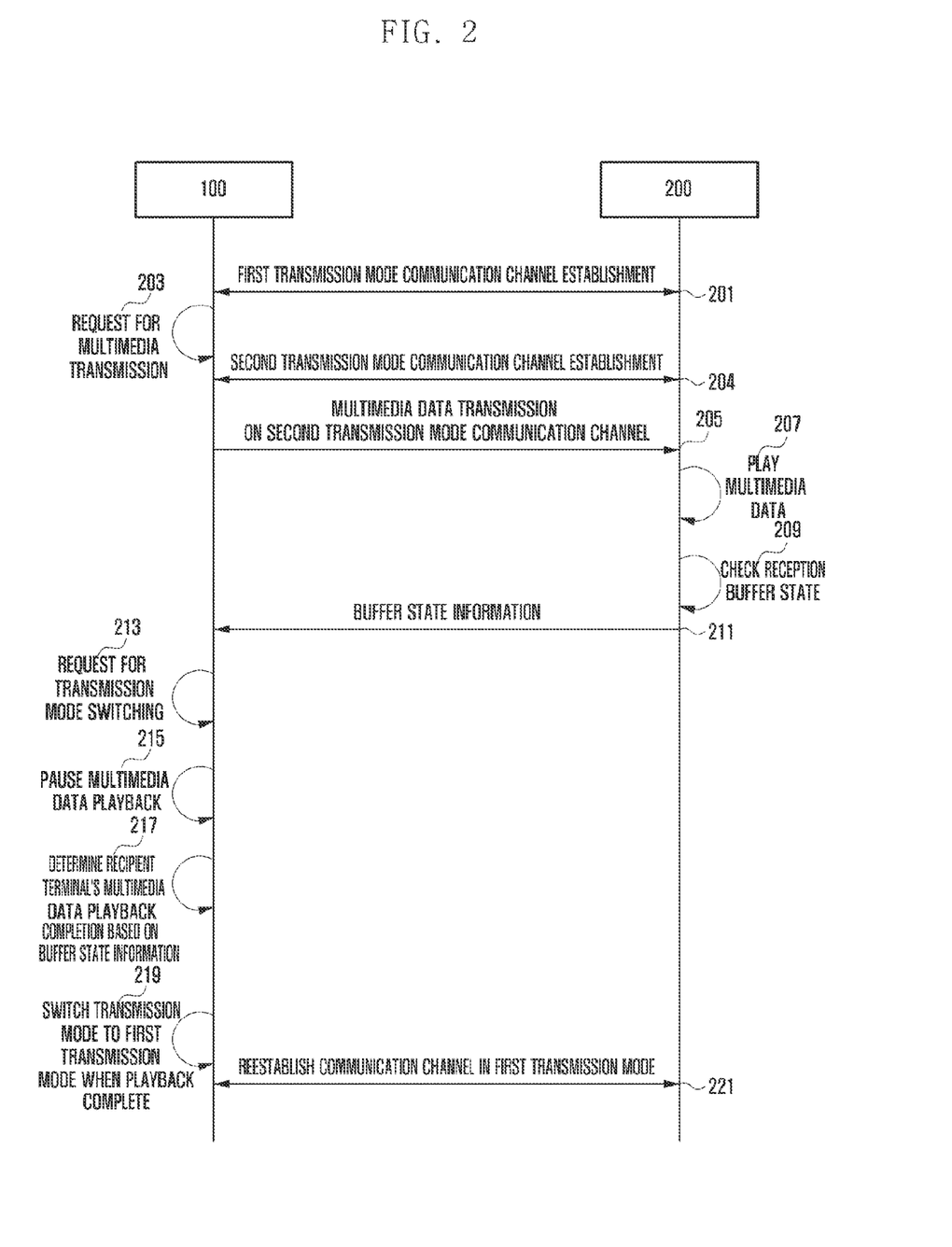
FIG. 2 is a message flow diagram illustrating message flows between a transmission terminal and a recipient terminal in a wireless communication channel operation system according to an embodiment of the disclosure.

FIG. 2 is a message flow diagram illustrating message flows between a transmission terminal and a recipient terminal in a wireless communication channel operation system according to an embodiment of the disclosure.

Referring to FIG. 2, if a wireless video transmission mode is activated, then at operation 201, the transmission terminal 100 establishes a first transmission mode communication channel with the recipient terminal 200. At this time, the first transmission mode communication channel may be the UDP channel.

At operation 203, the transmission terminal 100 may detects a multimedia data transmission request. The multimedia data transmission request may occur when a specific multimedia file is selected. The multimedia data may be any of video data, audio data, and/or the like.

If the multimedia data transmission request is detected (e.g., if the transmission terminal 100 detects a multimedia transmission request) at operation 203, then the transmission terminal 100 may proceed to operation 204 at which the transmission terminal 100 may establish a communication channel with the recipient terminal 200 in a second transmission mode. The second transmission mode communication channel may be the TCP communication channel. According to various embodiments of the present disclosure, a reason for switching to the second transmission mode in detection of the multimedia data transmission request may be to guarantee the display quality of the multimedia by preventing the multimedia data from being lost.

At operation 205, the transmission terminal 100 may transmit the multimedia data to the recipient terminal 200 through the communication channel of the second transmission mode. According to various embodiments of the present disclosure, in order to transmit the multimedia data seamlessly, the transmission terminal 100 may have a buffer with a predetermined size to buffer the multimedia data to be transmitted.

At operation 207, the recipient terminal 200 may play the multimedia data received from the transmission terminal 100. In order to play the multimedia data seamlessly, the recipient terminal 200 may have a reception buffer with a predetermined size to buffer the received multimedia data. Because the multimedia data is buffered in the transmission buffer at the transmission terminal 100 and the reception buffer at the recipient terminal 200, latency exists between the transmission terminal 100 and the recipient terminal 200. The latency between the transmission terminal 100 and the recipient terminal 200 is prolonged when the channel environment between the transmission terminal 100 and the recipient terminal 200 is bad.

At operation 209, the recipient terminal 200 may check (e.g., determine) the state of the reception buffer. In particular, the recipient terminal 200 may check (e.g., determine) the multimedia amount buffered in the reception buffer.

At operation 211, the recipient terminal 200 transmits to (e.g., sends) the transmission terminal 100 the buffer state information indicating the state of the reception buffer.

After receiving the buffer state information, at operation 213, the transmission terminal 100 detects a transmission mode switching request. For example, the transmission mode switching request may occur when the multimedia playback has completed.

If the transmission terminal 100 detects the transmission mode switching request at operation 213, then the transmission terminal 100 may proceed to operation 215 at which the transmission terminal 100 may pause the multimedia playback. According to various embodiments of the present disclosure, although the multimedia playback has completed already, the transmission terminal 100 may not end the playback of the multimedia, rather, the transmission terminal 100 may pause the playback of the multimedia.

At operation 217, the transmission terminal 100 may check (e.g., determine) the multimedia playback end time of the recipient terminal 200. In detail, the transmission terminal 100 may estimate the multimedia data playback end time at the recipient terminal 200 based on the buffer state information received at operation 211. According to various embodiments of the present disclosure, the residual data amount buffered in the reception buffer increases in the range of the total size of the reception buffer in proportion to the latency.

If the residual multimedia data playback end time arrives, then at operation 219, the transmission terminal 100 switches the transmission mode to the first transmission mode.

At operation 221, the transmission terminal 100 reestablishes the communication channel with the recipient terminal 200 in the first transmission mode.

Figure 3:
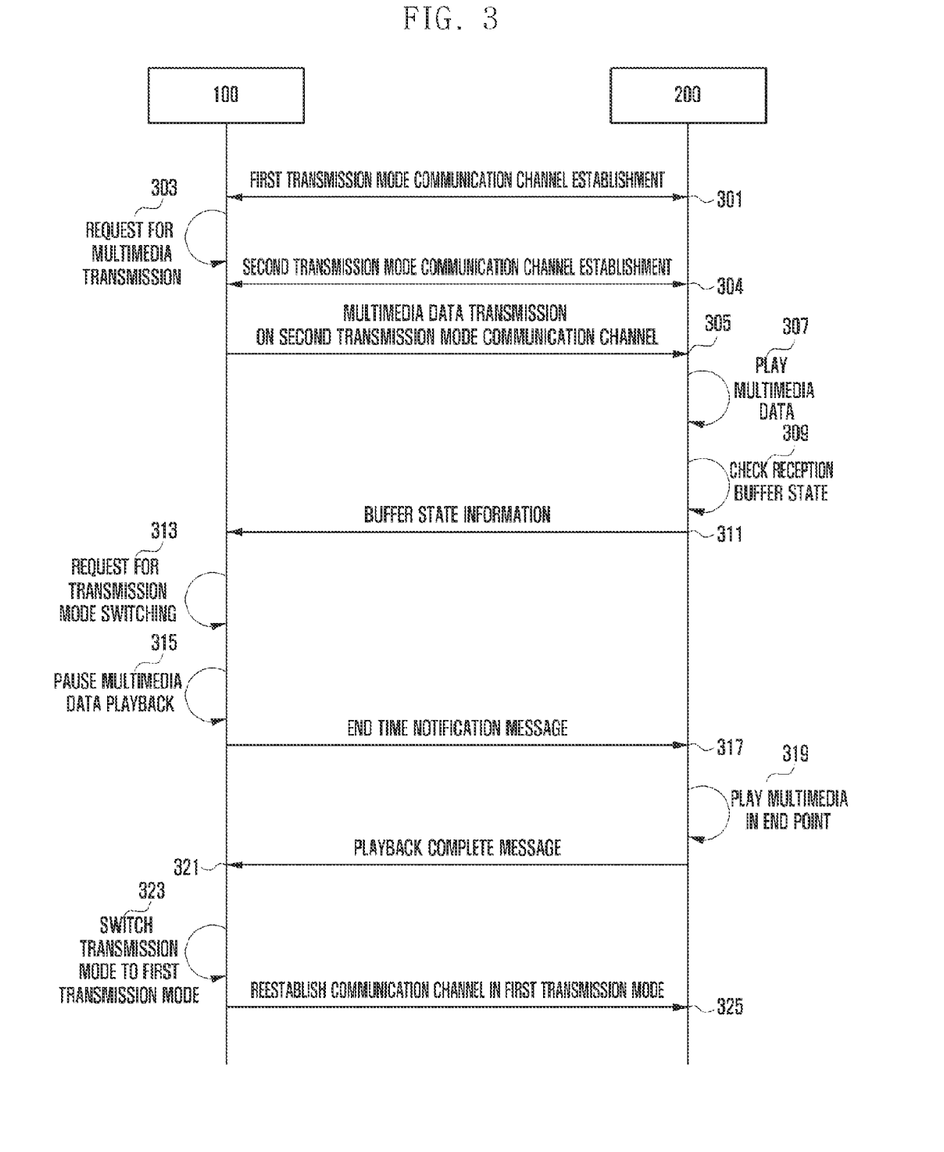
FIG. 3 is a message flow diagram illustrating message flows between a transmission terminal and a recipient terminal in a wireless communication channel operation system according to an embodiment of the disclosure.

FIG. 3 is a message flow diagram illustrating message flows between a transmission terminal and a recipient terminal in a wireless communication channel operation system according to an embodiment of the disclosure.

Referring to FIG. 3, if the wireless communication transmission mode is activated, at operation 301, the transmission terminal 100 may establish a first transmission mode communication channel with the recipient terminal 200. At this time, the first transmission mode communication channel may be the UDP channel.

At operation 303, the transmission terminal 100 may detect a multimedia data transmission request.

If the multimedia data transmission request is detected (e.g., if the transmission terminal 100 detects a multimedia transmission request) at operation 303, then the transmission terminal 100 may proceed to operation 304 at which the transmission terminal 100 may establish a second transmission mode communication channel with the recipient terminal 200. The second transmission mode communication channel may be the TCP channel.

At operation 305, the transmission terminal 100 may transmit the requested multimedia data to the recipient terminal 200 through the second transmission mode communication channel. According to various embodiments of the present disclosure, in order to transmit the multimedia seamlessly, the transmission terminal 100 may have a buffer with a predetermined size to buffer the multimedia data to be transmitted.

At operation 307, the recipient terminal 200 may play the multimedia data received from the transmission terminal 100. In order to play the multimedia data seamlessly, the recipient terminal 200 may have a reception buffer with a predetermined size to buffer the received multimedia data.

At operation 309, the recipient terminal 200 may check (e.g., determine) the state of the reception buffer at operation 309. In particular, the recipient terminal 200 may check (e.g., determine) the multimedia data amount remained in the reception buffer.

At operation 311, the recipient terminal 200 may transmit buffer state information indicating the state of the reception buffer.

After receiving the buffer state information, at operation 313, the transmission terminal 100 detects a transmission mode switching request.

If the transmission terminal 100 detects the transmission mode switching request at operation 315, then the transmission terminal 100 may proceed to operation 315 at which the transmission terminal 100 may pause the multimedia playback. According to various embodiments of the present disclosure, although the multimedia playback has completed already, the transmission terminal 100 may not end the playback of the multimedia, rather, the transmission terminal 100 may pause the playback of the multimedia.

At operation 317, the transmission terminal 100 may transmit to (e.g., send) the recipient terminal 200 a playback end time notification message including the time when the multimedia data playback has paused. For example, the transmission terminal 100 informs the recipient terminal 200 of the multimedia data playback termination along with the playback end time information.

If the playback end time notification message is received, then, at operation 319, the recipient terminal 200 may play the multimedia data to the playback end time. For example, the recipient terminal 200 may play the multimedia data remained in the reception buffer.

If the multimedia data playback has completed at the playback end time, then, at operation 321, the recipient terminal 200 may send the transmission terminal 100 a playback complete message.

If the playback complete message is received, then, at operation 323, the transmission terminal 100 switches the transmission mode to the first transmission mode.

At operation 325, the transmission terminal 100 reestablishes the communication channel with the recipient terminal 200 in the first transmission mode.

Figure 4:
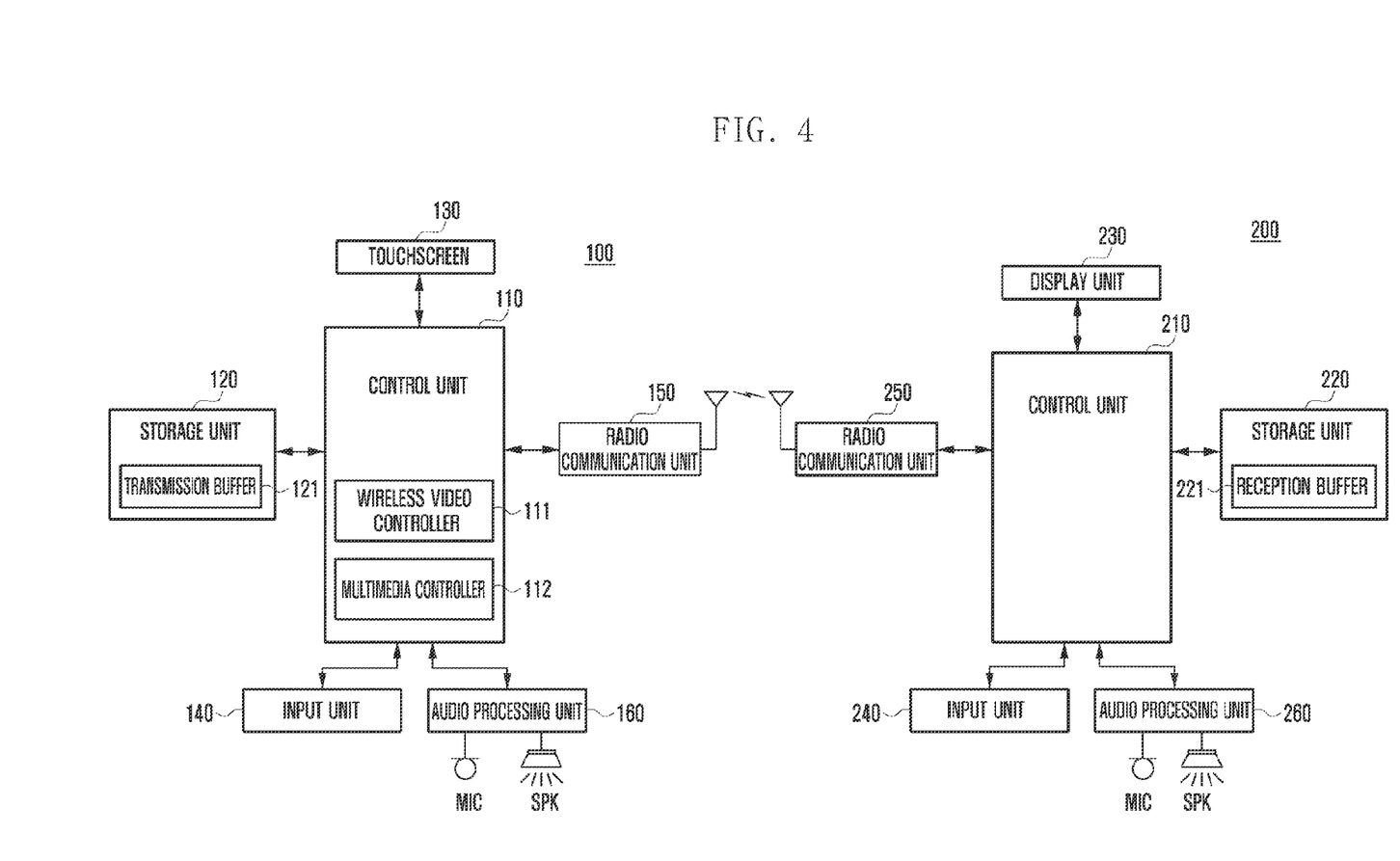
FIG. 4 is a block diagram illustrating configurations of a transmission terminal and a recipient terminal according to an embodiment of the disclosure.

FIG. 4 is a block diagram illustrating configurations of a transmission terminal and a recipient terminal according to an embodiment of the disclosure.

Referring to FIG. 4, according to various embodiments of the present disclosure, the transmission terminal 100 includes a control unit 110, a storage unit 120, a touchscreen 130, an input unit 140, a radio communication unit 150, and an audio processing unit 160. The control unit 110 may include a wireless video controller 111 and a multimedia controller 112, and the storage unit 120 may include a transmission buffer 121.

The audio processing unit 160 may be connected to a Speaker (SPK) for outputting audio signal incoming and outgoing in telephony mode, attached to a message, and decoded from the multimedia data stored in the storage unit 120, and a Microphone (MIC) for collecting (e.g., receiving) a user's speech and other audio signal. The audio processing unit 160 may output the sound effects associated with control of the wireless video transmission function and touch input through the SPK.

The radio communication unit 150 is responsible for radio communication of the transmission terminal 100. The radio communication unit 150 may include a Wi-Fi communication module, and/or the like. If the transmission terminal 100 (e.g., the radio communication unit 150) supports cellular communication function, the transmission terminal 100 may include a cellular communication module. According to various embodiments of the disclosure, the radio communication unit 150 may establish a wireless communication channel for transmitting video. The communication channel may be one of the first and second transmission mode communication channels. According to various embodiments of the present disclosure, the first communication mode may be UDP mode, and the second communication mode may be TCP mode.

The radio communication unit 150 may transmit a home screen, a webpage, and/or the like to the recipient terminal 200 through the first transmission mode communication channel. The radio communication unit 150 may transmit multimedia data through a second transmission mode communication channel. The radio communication unit 150 may transmit the playback end time notification message to the recipient terminal 200 and may receive the buffer state information and playback complete message from the recipient terminal 200.

The input unit 140 may include plural input keys and function keys for inputting alphanumeric information and configuring various functions. The function keys may include navigation keys, side keys, shortcut keys designated for specific functions, and/or the like. The input unit 140 may generate the key signals associated with the user configuration and terminal function control to the control unit 110. The input unit 140 may be implemented with at least one of QWERTY keypad, 3*4 keypad, 4*3 keypad, ball joystick, optical joystick, wheel key, touch key, touch pad, touchscreen, and/or the like. If the transmission terminal 100 supports full-touch function, then the input unit 140 may include only the volume keys and screen on/off and power on/off keys on a side of the case of the transmission terminal 100. According to various embodiments of the disclosure, the first input unit 140 may include multimedia playback function control keys includes data play key, pause key, previous file playback key, next file playback key, and/or the like.

The touchscreen 130 may provide input and output functions. For this purpose, the touchscreen 130 may include a display unit (not shown) and a touch input unit (not shown). The display unit displays information input by and to be provided to the user as well as various menus. For example, the display unit may provide various screen data associated with the operation of the transmission terminal 100 such as a home screen, a message composition/viewing screen, a webpage screen, a telephony screen, and/or the like. According to various embodiments of the present disclosure, the display unit may display wireless video transmission function control screens such as a multimedia data selection screen, a multimedia data playback control command input screen, and/or the like. The display unit may be implemented with at least one of Liquid Crystal Display (LCD), Organic Light Emitting Diode (OLED), Active Matrix OLED (AMOLED), and/or the like.

The touch input unit is responsible for input function and generates a touch signal in response to touch or approach gesture made with a touch input tool (e.g., finger, stylus, electronic pen, and/or the like) to the control unit 110. In particular, the touch input unit detects the touch gesture based on the change in physical quantity (e.g., capacitance, resistance, and/or the like) according to the contact or approach of the touch input tool. According to various embodiments of the present disclosure, the touch input unit may generate a touch signal for controlling the wireless video transmission service such as a multimedia file selection touch signal, multimedia data transmission request touch signal, a multimedia data playback control signal (e.g., pause and end), and/or the like to the control unit 110.

The storage unit 120 may store an Operating System (OS) of the transmission terminal 100, application programs associated with optional functions (e.g., a audio playback function, a still and/or motion picture playback function, a broadcast playback function, and/or the like), user data, and application data. For example, the storage unit 120 may store video files, game files, music files, movie files, and/or the like. According to various embodiments of the disclosure, the storage unit 120 may store the wireless video transmission program for transmitting video data to another terminal through radio channel. The wireless video transmission program switches the transmission mode of the communication channel from the first transmission mode channel to the second transmission mode channel in response to the multimedia data playback request. The wireless video transmission program may thereafter check (e.g., determine) the presence/absence of multimedia data to be played in the reception buffer 221. If the wireless video transmission program or the like determines that there is multimedia to be played, the wireless video transmission program waits until the remaining data is played completely, and then switches the transmission mode from the second transmission mode to the first transmission mode The storage unit 120 may include a transmission buffer 121. The transmission buffer 121 has a predetermined size large enough to transmit the data seamlessly. The transmission buffer 121 may be included in the control unit 110.

The control unit 110 controls overall operations of the transmission terminal 100 and signal flows among the internal function blocks of the transmission terminal 100 and processes data. For example, the control unit 110 may be implemented in the form of Central Processing Unit (CPU), Application Processor (AP), and/or the like. The control unit 110 may be implemented as a single core processor or multi-core processor.

The control unit 110 may control the procedure of providing a wireless video transmission service to provide the recipient terminal 200 with multimedia data. According to various embodiments of the present disclosure, the control unit 110 may include a wireless video controller 111 and a multimedia controller 112 to provide the wireless video transmission service to provide the recipient terminal 200 with multimedia data.

The wireless video controller 111 controls overall operations of wireless video data transmission. In particular, if the wireless video transmission mode is activated, the wireless video controller 111 establishes a first transmission mode communication channel and controls transmission of home screen through the first transmission mode communication channel. Thereafter, if a multimedia playback request is input, the wireless video controller 111 switches from the first transmission mode communication channel to the second transmission mode communication channel and controls to transmit the multimedia data to the recipient terminal 200 through the second transmission mode communication channel. Thereafter, the wireless video controller 110 receives the buffer state information from the recipient terminal 200.

The multimedia controller 112 may control the playback of the multimedia data. For example, the multimedia controller 112 may include a multimedia player for playing the multimedia data. If the multimedia playback has completed, the multimedia controller 112 enters the pause state and sends the wireless video controller 111 an End Of Stream (EOS) message notifying of the entry to the pause state. If the EOS message is received, the wireless video controller 111 may check (e.g., determine) whether there is multimedia data to be played in the reception buffer 221 of the recipient terminal 200 based on the buffer state information. If there is multimedia data in the reception buffer 221, the wireless video controller 111 may estimate the playback complete time of the multimedia data remained in the reception buffer 221 based on the buffer state information. Afterward, if the playback complete time arrives, the wireless video controller 111 may control such that the transmission mode is switched to the first transmission mode. At this time, the multimedia controller 112 may terminate the multimedia data playback.

If the multimedia data playback has completed, the multimedia controller 112 enters the pause state and sends the wireless video controller 111 an EOS message (hereinafter, referred to as end time notification message). The wireless video controller 111 may control to transmit the end time notification message to the recipient terminal 200. Afterward, if a playback complete message as a response to the end time notification message is received from the recipient terminal 200, the wireless video controller 111 may transmit the multimedia controller 112 the playback complete message. If the playback complete message is received, the multimedia controller 112 may end the multimedia data playback.

Referring to FIG. 4, the recipient terminal 200 includes a controller 210, a storage unit 220, a display unit 230, an input unit 240, a radio communication unit 250, and an audio processing unit 260. The storage unit 220 may include a reception buffer 221. For the convenience purpose, the descriptions on the function blocks similar to those of the transmission terminal 100 are omitted herein.

The audio processing unit 260 may output the audio signal decoded in playback of the multimedia data received from the transmission terminal 100.

The radio communication unit 250 may establish a communication channel in one of the first and second transmission modes and receive home screen and multimedia data through the communication channel. The radio communication unit 250 may receive the end time notification message from the transmission terminal 100 and transmit the buffer state information and playback complete message to the transmission terminal 100.

The display unit 230 may display the home screen and multimedia data playback screen received from the transmission terminal 100. The display unit 230 may be implemented in the form of a touchscreen. If the display unit 230 is implemented in the form of a touchscreen, then the display unit 230 may work as a part of the input unit 240.

The storage unit 220 may include a reception buffer 221. The reception buffer 221 may buffer a predetermined size of multimedia data transmitted by the transmission terminal 100. According to various embodiments of the present disclosure, the reception buffer 221 may buffer a predetermined size of multimedia data transmitted by the transmission terminal 100 in order to guarantee seamless playback of the multimedia data. The reception buffer 221 may be included in the second control unit 210.

The control unit 210 may control the display unit 230 to display the multimedia data received by the radio communication unit 250. The control unit 210 may check (e.g., determine) the state of the reception buffer 221 and control the radio communication unit 250 to transmit the buffer state information to the transmission terminal 100. If the end time notification message is received, the control unit 210 may play the multimedia data remained in the reception buffer to the end time. Thereafter, if the multimedia data remained in the reception buffer 221 has been played completely, the control unit 210 may control the radio communication unit 250 to transmit the playback complete message to the transmission terminal 100. The control unit 210 is described in more detail later with reference to FIG. 6.

According to various embodiments of the present disclosure, the recipient terminal 200 may be implemented with a dongle capable of establishing a communication channel with the transmission terminal 100 and a display device for displaying data received from the dongle.

Although not shown in FIG. 4, each of the transmission terminal 100 and recipient terminal 200 may include a GPS module for receiving location information, a broadcast reception module for receiving broadcast signals, a digital audio playback module such as MP3 module for playing audio files, and/or the like. Although it is difficult to enumerate all of the functional components that can be converged in various manners according to the trend of digital convergence, each of the transmission terminal and the recipient terminal can be implemented with or without at least one of aforementioned functional components and equivalent devices thereof.

Figure 5:
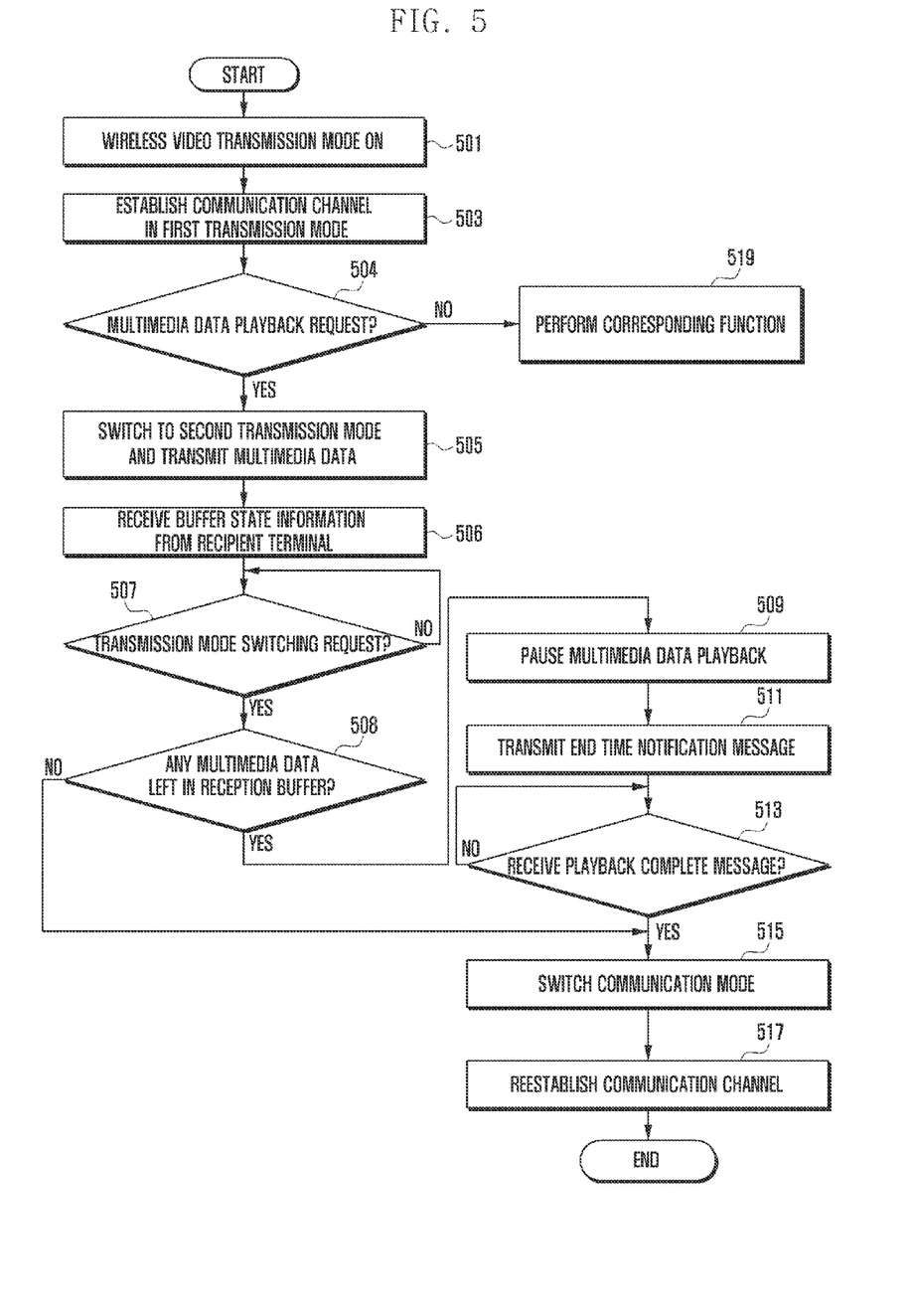
FIG. 5 is a flowchart illustrating a wireless communication channel operation method of a transmission terminal of a wireless communication channel operation system according to an embodiment of the disclosure.

FIG. 5 is a flowchart illustrating a wireless communication channel operation method of a transmission terminal of a wireless communication channel operation system according to an embodiment of the disclosure.

Referring to FIG. 5, according to various embodiments of the present disclosure, at operation 501, the control unit 110 of the transmission terminal 100 may detect activation (ON) of the wireless video transmission mode. According to various embodiments of the present disclosure, the wireless video transmission mode may be a transmission mode based on any of WFD, WiDi, Miracast™, and/or the like.

If the wireless video transmission mode is activated at operation 501, then, at operation 503, the control unit 110 may establish a first transmission mode communication channel with the recipient terminal 200 by means of the radio communication unit 150. According to various embodiments of the present disclosure, the first transmission mode may be the UDP mode. At this time, the control unit 110 may transmit the home screen to the recipient terminal 200 through the first transmission mode communication channel.

At operation 504, the control unit 110 may monitor to detect a user input and determine, if a user input is detected, whether the user input is a multimedia data transmission request. According to various embodiments of the present disclosure, the multimedia data transmission request may be generated when a specific multimedia file is selected for execution. In particular, according to various embodiments of the present disclosure, the control unit 110 may present a list of multimedia data files stored in the storage unit 120 in order for the user to select any multimedia file and, if a multimedia data file is selected from the list, monitor to detect a multimedia data transmission (or playback) command input.

If user input is detected and the control unit 110 determines that the user input does not correspond to the multimedia data transmission request at operation 504, then the control unit 110 may proceed to operation 519 at which the control unit 110 performs a function corresponding to the user input. For example, the control unit 110 may perform a multimedia data selection according to the user request or the control unit 110 may stay at operation 504 at which the control unit 110 continues to poll for a user input corresponding to the multimedia data transmission request.

In contrast, if user input is detected and the control unit 110 determines that the user input corresponds to the multimedia data transmission request at operation 504, then the control unit 110 may proceed to operation 505 at which the control unit 110 may switch from the first transmission mode communication channel to the second transmission mode communication channel and transmit the multimedia data to the recipient terminal 200 through the second transmission mode communication channel. At this time, the control unit 110 may control the transmission buffer 121 with a predetermined size to buffer the multimedia to transmit seamlessly. The second transmission mode may be TCP mode.

At operation 506, the control unit 110 may receive the buffer state information from the recipient terminal 200. The buffer state information may be the information on the multimedia data amount remained in the reception buffer 221 of the recipient terminal 200. The buffer state information may be received at a predetermined interval.

At operation 507, the control unit 110 may check (e.g., determine) whether the transmission mode switching request is detected. For example, the transmission mode switching request may be generate when the multimedia data playback has completed.

If the control unit 110 determines that no transmission mode switching request is detected at operation 507, then the control unit 110 may maintain operation 507. For example, the control unit 110 may continue to poll for a transmission mode switching request. For example, the control unit 100 may continue multimedia data transmission to the recipient terminal 200 in the second transmission mode.

In contrast, if the control unit 110 determines that the transmission mode switching request is detected at operation 507, then the control unit 110 may proceed to operation 508 at which the control unit 110 determines whether the reception buffer 221 of the recipient terminal 200 has the multimedia data remained. For example, the control unit 110 may check (e.g., determine) the presence/absence of the multimedia data to be played in the reception buffer 221 based on the buffer state information received from the recipient terminal 200.

If the control unit 110 determines that no multimedia data exists in the reception buffer 221 at operation 508, then the procedure proceeds to operation 515.

In contrast, if the control unit 110 determines that multimedia data to be played exists in the reception buffer 221 at operation 508, then the control unit 110 may proceed to operation 509 at which the control unit 110 pauses the multimedia data playback. According to various embodiments of the present disclosure, the control unit 110 may pause the multimedia data playback rather than terminate the multimedia data playback although the multimedia playback has completed already.

Thereafter, at operation 511, the control unit 110 may transmit an end time notification message including the multimedia data playback pause time to the recipient terminal 200.

At operation 513, the control unit 110 may determine whether a multimedia playback complete message is received. For example, the control unit 110 may determine whether a multimedia playback complete message is received before the playback pause time.

If the control unit 110 determines that no playback complete message is received at operation 513, then the control unit 110 may maintain operation 513. For example, the control unit 110 may continue to poll for reception of the playback complete message.

In contrast, if the control unit 110 determines that the playback complete message is received at operation 513, then the control unit 110 proceeds to operation 515 at which the control unit 110 performs transmission mode switching.

At operation 517, the control unit 110 reestablishes the transmission channel in the switched transmission mode. According to various embodiments of the present disclosure, the control unit 110 may switch the transmission mode from the second transmission mode to the first transmission.

Figure 6:
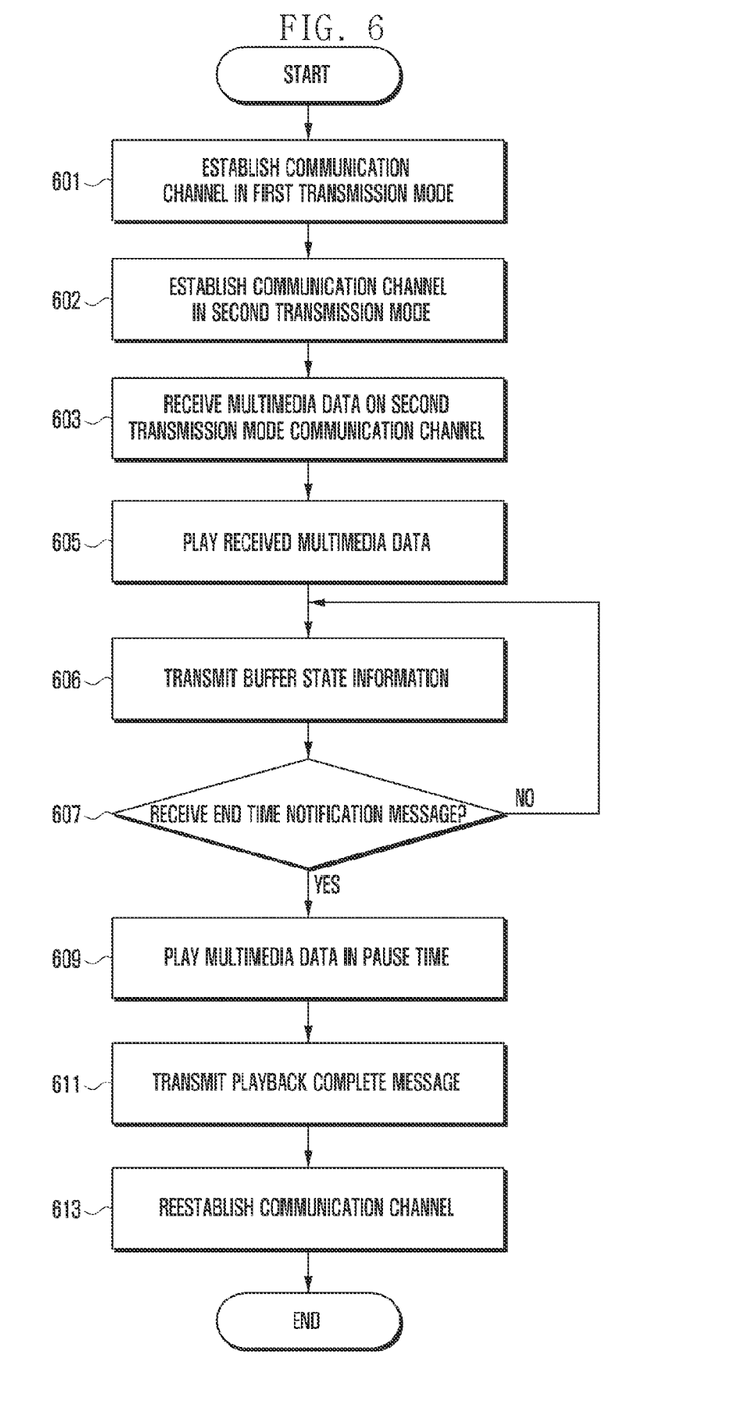
FIG. 6 is a flowchart illustrating a wireless communication channel operation method of a recipient terminal of a wireless communication channel operation system according to an embodiment of the disclosure.

FIG. 6 is a flowchart illustrating a wireless communication channel operation method of a recipient terminal of a wireless communication channel operation system according to an embodiment of the disclosure.

Referring to FIG. 6, according to various embodiments of the present disclosure, at operation 601, the control unit 210 of the recipient terminal 200 may establish a first transmission mode communication channel with the transmission terminal 100. According to various embodiments of the present disclosure, the first transmission mode may be the UDP mode. The recipient terminal 200 may receive the home screen from the transmission terminal 100.

At operation 602, the control unit 210 may establish a second transmission mode communication channel with the transmission terminal 100. The transmission terminal 100 may request for transmission mode switching. The transmission mode switching request may be generated when a multimedia data transmission request is input. The second transmission mode may be the TCP mode guaranteeing reliability.

At operation 603, the control unit 210 may receive multimedia data through the second transmission mode communication channel. The control unit 210 may control the reception buffer 221 to buffer the multimedia data as much as a predetermined buffer size.

At operation 605, the control unit 210 may play the received multimedia data.

In the state of playing the received multimedia data, at operation 606, the control unit 210 may check (e.g., determine) the state of the reception buffer 221 and sends the buffer state information to the transmission terminal 100. For example, the control unit 210 may send the transmission terminal 100 the buffer state information at a predetermined interval. The buffer state information includes the information on the multimedia data amount accumulated in the reception buffer 221.

At operation 607, the control unit 210 may determine whether an end time notification message including a multimedia data playback pause (end) time is received.

If the control unit 210 determines that no end time notification message is received at operation 607, then the control unit 201 returns the procedure to operation 606.

In contrast, if the control unit 210 determines that the end time notification message is received at operation 607, then the control unit 210 may proceed to operation 609 at which the control unit 210 may play the multimedia data remained in the reception buffer 221 completely.

Thereafter, at operation 611, the control unit 210 may transmits a playback compete message to the recipient terminal 200.

At operation 613, the control unit 210 may reestablish the first transmission mode communication channel according to the request from the transmission terminal 100.

As described above, according to various embodiments of the present disclosure, the wireless communication channel operation method and system of a portable terminal are capable of preventing the data from being lost. For example, according to various embodiments of the present disclosure, the wireless communication channel operation method and system are capable of allowing the user to consume the information transmitted by the transmission terminal 100 completely without loss. For example, when a transmission mode switching request is detected in the state of transmitting video data, the transmission terminal 100 performs transmission mode switching after the video data buffered in the reception buffer of the recipient terminal are played completely. As a result, according to various embodiments of the present disclosure, the wireless communication channel operation method and system are capable of overcoming the problem of the method according to the related art in which the multimedia data transmitted by the transmission terminal are not played completely due to the discard of the multimedia remained in the reception buffer when the transmission mode switching occurs.

According to various embodiments of the present disclosure, the above-described wireless communication channel operation method and system of a portable terminal can be implemented in the form of computer-executable program commands and stored in a non-transitory computer-readable storage medium. The non-transitory computer readable storage medium may store the program commands, data files, and data structures in individual or combined forms. The program commands recorded in the storage medium may be designed and implemented for various embodiments of the present disclosure or used by those skilled in the computer software field. The non-transitory computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, flash memory, and/or the like. The programs commands include the language code executable by computers using the interpreter as well as the machine language codes created by a compiler. The aforementioned hardware device can be implemented with one or more software modules for executing the operations of the various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wireless communication channel operation method of a portable terminal, the wireless communication channel operation method comprising:
    transmitting multimedia data to a reception terminal on a communication channel of a second transmission mode in a wireless video transmission mode, the wireless video transmission mode supporting a first transmission mode and the second transmission mode;
    receiving buffer state information of a reception buffer from the reception terminal;
    pausing, when a transmission mode switching request for switching to the first transmission mode is detected, transmission of the multimedia data to the reception terminal;
    determining the buffer state information;
    waiting, when the buffer state information indicates presence of multimedia data in the reception buffer of the reception terminal, for completion of playing of the multimedia data in the reception buffer; and
    switching from the second transmission mode to the first transmission mode after the multimedia data in the reception buffer is played completely.

2. The method of claim 1, further comprising:
    switching, when the buffer state information indicates an absence of multimedia data in the reception buffer, from the second transmission mode to the first transmission mode.

3. The method of claim 1, wherein the waiting for the completion of playing of the multimedia data comprises estimating a playback completion time of the multimedia data remaining in the reception buffer of the reception terminal based on the buffer state information.

4. The method of claim 1, wherein the waiting for the completion of playing of the multimedia data comprises:
    transmitting an end time notification message including multimedia data playback pause time to the reception terminal; and
    receiving a playback complete message notifying of completion of the multimedia data playback to the multimedia data playback pause time from the reception terminal.

5. The method of claim 1, wherein the transmission mode switching request is generated when the multimedia data playback is completed in the portable terminal.

6. The method of claim 1, wherein the communication channel of the first transmission mode is a User Datagram Protocol (UDP) channel, and the communication channel of the second transmission mode is a Transmission Control Protocol (TCP) channel.

7. The method of claim 1, wherein the transmitting of the multimedia data comprises:
    establishing, when the wireless video transmission mode is activated, the communication channel of the first transmission mode;
    receiving a multimedia data transmission request in a state in which the communication channel of the first transmission mode is established; and
    switching from the first transmission mode to the second transmission mode.

8. A wireless communication channel operation method of a terminal, the wireless communication channel operation method comprising:
    playing multimedia data received from a transmission terminal on a communication channel of a second transmission mode in a wireless video transmission mode, the wireless video transmission mode supporting a first transmission mode and the second transmission mode;
    determining a state of a reception buffer periodically while playing the multimedia data;
    transmitting buffer state information generated based on the state of the reception buffer to the transmission terminal; and
    reestablishing, when a transmission mode switching request is received from the transmission terminal, the communication channel in the first transmission mode.

9. The method of claim 8, further comprising:
    receiving an end time notification message including a multimedia data playback pause time from the transmission terminal;
    completing playback of the multimedia data remaining in the reception buffer to the playback pause time; and
    transmitting playback complete message notifying of completion of the multimedia data playback to the playback pause time.

10. The method of claim 8, wherein the first transmission mode is User Datagram Protocol (UDP) mode, and the second transmission mode is Transmission Control Protocol (TCP) mode.

11. A wireless communication channel operation system including a transmission terminal and a reception terminal is characterized in that, the wireless communication channel operation system comprising:

the transmission terminal transmits multimedia data to a reception terminal on a communication channel of a second transmission mode in a wireless video transmission mode, the wireless video transmission mode supporting a first transmission mode and the second transmission mode, receives buffer state information of a reception buffer from the reception terminal, pauses, when a transmission mode switching request for switching to the first transmission mode is detected, transmission of the multimedia data to the reception terminal, determines the buffer state information, waits, when the buffer state information indicates presence of multimedia data in the reception buffer of the reception terminal, for completion of playing of the multimedia data in the reception buffer is played completely, and switches from the second transmission mode to the first transmission mode after the multimedia data in the reception buffer is played completely; and the reception terminal plays multimedia data received from the transmission terminal on the communication channel of the second transmission mode in the wireless video transmission mode, determines a state of the reception buffer periodically while playing the multimedia data, transmits buffer state information generated based on the state of the reception buffer to the transmission terminal, and reestablishes, when a transmission mode switching request is received from the transmission terminal, the communication channel in the first transmission mode.

12. The system of claim 11, wherein the transmission terminal estimates a playback completion time of the multimedia data remaining in the reception buffer of the reception terminal based on the buffer state information.

13. The system of claim 11, wherein the transmission terminal transmits an end time notification message including multimedia data playback pause time to the reception terminal after pausing transmission of the multimedia data; and wherein the reception terminal completes playback of the multimedia data remaining in the reception buffer to the multimedia data playback pause time, and transmits playback complete message notifying of completion of the multimedia data playback to the multimedia data playback pause time, wherein the transmission terminal switches, when the playback complete message is received, from the second transmission mode to the first transmission mode.

14. The system of claim 11, wherein the transmission terminal regards completion of multimedia data playback as a request for switching from the second transmission mode to the first transmission mode.

15. The system of claim 11, wherein the transmission terminal switches, when no multimedia data exists in the reception buffer of the reception terminal, from the second transmission mode to the first transmission mode immediately.

16. The system of claim 11, wherein the first transmission mode is User Datagram Protocol (UDP) mode, and the second transmission mode is Transmission Control Protocol (TCP) mode.

17. The system of claim 11, wherein the transmission terminal establishes, when the wireless video transmission mode is activated, the communication channel of the first transmission mode, switches, when a multimedia data transmission request is received in a state where the communication channel of the first transmission mode is established, from the first transmission mode to the second transmission mode, and transmits the requested multimedia data to the reception terminal in the second transmission mode.

* * * * *